US012244066B2

(12) United States Patent
Shamblin et al.

(10) Patent No.: US 12,244,066 B2
(45) Date of Patent: Mar. 4, 2025

(54) MULTI-BAND MASSIVE MIMO ANTENNA ARRAY

(71) Applicant: Innophase, Inc., San Diego, CA (US)

(72) Inventors: Jeffrey Shamblin, San Marcos, CA (US); Yang Xu, San Diego, CA (US); Claudio Anzil, Encinitas, CA (US)

(73) Assignee: INNOPHASE, INC., San Diego, CA (US)

(*) Notice: Subject to any disclaimer, the term of this patent is extended or adjusted under 35 U.S.C. 154(b) by 33 days.

(21) Appl. No.: 17/772,861

(22) PCT Filed: Oct. 28, 2020

(86) PCT No.: PCT/US2020/057782
§ 371 (c)(1),
(2) Date: Apr. 28, 2022

(87) PCT Pub. No.: WO2021/086998
PCT Pub. Date: May 6, 2021

(65) Prior Publication Data

US 2022/0384964 A1 Dec. 1, 2022

Related U.S. Application Data

(60) Provisional application No. 62/927,109, filed on Oct. 28, 2019.

(51) Int. Cl.
*H01Q 21/06* (2006.01)
*H01Q 5/307* (2015.01)
(Continued)

(52) U.S. Cl.
CPC .......... *H01Q 21/064* (2013.01); *H01Q 5/307* (2015.01)

(58) Field of Classification Search
CPC .......... H01Q 3/24; H01Q 21/00; H01Q 13/10; H01Q 21/26; H01Q 5/00; H01Q 21/12; H01Q 9/16; H01Q 1/38; H01Q 1/50
See application file for complete search history.

(56) References Cited

U.S. PATENT DOCUMENTS

| | | | |
|---|---|---|---|
| 852,424 | A | 5/1907 | Edison |
| 4,527,163 | A | 7/1985 | Stanton |

(Continued)

FOREIGN PATENT DOCUMENTS

| | | | |
|---|---|---|---|
| EP | 0349069 | A1 | 1/1990 |
| EP | 2911323 | A1 | 8/2015 |

(Continued)

OTHER PUBLICATIONS

International Search Report and Written Opinion for PCT/US2019/044246, Oct. 22, 2019, 1-12 (12 pages).

(Continued)

*Primary Examiner* — Wei (Victor) Y Chan

(57) ABSTRACT

A dual-band, tri-band, or higher-order multi-band array of antenna elements, with each element, or subsets of elements, connected to multiple radios at each antenna port. In one embodiment, an array comprises a 128 element Massive MIMO array having 64 horizontally-polarized (H-pol) and 64 vertically-polarized (V-pol) elements configured to provide dual polarization capability over multiple bands to accommodate highly-configurable simultaneous 4G and 5G operation.

15 Claims, 13 Drawing Sheets

(51) Int. Cl.
*H01Q 9/16* (2006.01)
*H01Q 13/00* (2006.01)

(56) References Cited

U.S. PATENT DOCUMENTS 5,268,701 A * 12/1993 Smith .................... H01Q 21/24 343/770
5,534,880 A 7/1996 Button et al.
5,809,422 A 9/1998 Raleigh et al.
5,895,405 A 4/1999 Inderbitzen
6,362,796 B1 3/2002 Bohlman
7,058,844 B2 6/2006 Wiley et al.
7,085,544 B2 8/2006 Takano et al.
7,109,791 B1 9/2006 Epperson et al.
7,248,842 B2 7/2007 Takano et al.
7,280,848 B2 10/2007 Hoppenstein
7,433,653 B2 10/2008 Takano et al.
8,489,041 B2 7/2013 Teillet et al.
8,498,601 B2 7/2013 Horng et al.
8,829,993 B2 9/2014 Briffa et al.
8,867,418 B2 10/2014 Mishra et al.
8,873,677 B1 10/2014 Loh et al.
8,879,416 B2 11/2014 Mishra et al.
9,107,092 B2 8/2015 Agarwal et al.
9,113,352 B2 8/2015 Agarwal et al.
9,160,287 B2 10/2015 Briffa et al.
9,172,336 B2 10/2015 Briffa et al.
9,232,547 B2 1/2016 Mishra et al.
9,438,278 B2 9/2016 Barker et al.
9,455,959 B1 9/2016 Garg et al.
9,513,361 B1 12/2016 Elsallal et al.
9,568,601 B1 2/2017 Xu et al.
9,615,266 B1 4/2017 Cheadle et al.
9,641,206 B2 5/2017 Pratt et al.
9,735,940 B1 8/2017 Bakr et al.
9,973,943 B2 5/2018 Lysejko et al.
9,991,607 B1 6/2018 West et al.
10,108,148 B1 10/2018 Testi
10,145,230 B2 12/2018 Dacunha
10,148,230 B2 12/2018 Xu et al.
10,164,577 B2 12/2018 Briffa et al.
10,218,389 B2 2/2019 Huang et al.
10,256,847 B2 4/2019 Choi et al.
11,528,068 B2 * 12/2022 Xu ....................... H04B 7/0617
11,532,897 B2 * 12/2022 Xu ....................... H04B 7/0691
2002/0135514 A1 9/2002 Yoshida
2002/0180655 A1 * 12/2002 Mohuchy ............. H01Q 21/064 343/770
2003/0224740 A1 12/2003 Takano et al.
2004/0125038 A1 7/2004 Diximus et al.
2004/0198257 A1 10/2004 Takano et al.
2004/0202255 A1 10/2004 Dallal
2005/0179615 A1 8/2005 Mrstik et al.
2006/0217081 A1 9/2006 Takano et al.
2006/0256024 A1 * 11/2006 Collinson ............ H01Q 21/064 343/770
2007/0019748 A1 1/2007 Hoo et al.
2007/0040758 A1 2/2007 Dwyer et al.
2007/0249297 A1 10/2007 Takano et al.
2008/0026697 A1 1/2008 Signell et al.
2009/0011730 A1 1/2009 Liang et al.
2009/0036064 A1 2/2009 Ravi et al.
2009/0103593 A1 4/2009 Bergamo
2009/0153425 A1 * 6/2009 Le Naour ............ H01Q 13/085 343/893
2009/0160707 A1 6/2009 Lakkis
2009/0233644 A1 9/2009 McCune
2009/0259864 A1 10/2009 Li et al.
2010/0040184 A1 2/2010 Haralabidis et al.
2010/0048196 A1 2/2010 Georgantas et al.
2010/0090745 A1 4/2010 Kousai et al.
2010/0091900 A1 4/2010 Gan
2010/0136935 A1 6/2010 Plevridis
2010/0253426 A1 10/2010 Su et al.
2011/0129037 A1 6/2011 Staszewski et al.
2012/0071112 A1 3/2012 Rofougaran
2012/0200355 A1 8/2012 Braithwaite
2012/0212197 A1 8/2012 Fayed et al.
2012/0286866 A1 11/2012 Khanifar et al.
2012/0286868 A1 11/2012 Haroun et al.
2013/0082772 A1 4/2013 Seddighrad et al.
2013/0106667 A1 5/2013 Fenn et al.
2013/0143509 A1 6/2013 Horng et al.
2013/0200950 A1 8/2013 Bai
2013/0235807 A1 9/2013 Lee et al.
2013/0243121 A1 9/2013 Bai
2014/0035677 A1 2/2014 Chen et al.
2014/0049318 A1 2/2014 Goswami
2014/0118065 A1 5/2014 Briffa et al.
2014/0133456 A1 5/2014 Donepudi et al.
2014/0159835 A1 * 6/2014 Lo Hine Tong ...... H01P 5/1007 333/204
2014/0169496 A1 6/2014 Yang et al.
2014/0176385 A1 6/2014 Apostolos et al.
2014/0192768 A1 7/2014 Yeh et al.
2014/0233412 A1 8/2014 Mishra et al.
2015/0016567 A1 1/2015 Chen
2015/0094114 A1 4/2015 Rao et al.
2015/0098385 A1 4/2015 Navalekar et al.
2015/0098387 A1 4/2015 Garg et al.
2015/0116185 A1 4/2015 Wang et al.
2015/0229272 A1 8/2015 Hur et al.
2015/0288077 A1 10/2015 Friedman et al.
2016/0013762 A1 1/2016 Sun et al.
2016/0029430 A1 1/2016 Mishra et al.
2016/0044531 A1 2/2016 Papa et al.
2016/0065250 A1 3/2016 Volokhine et al.
2016/0099820 A1 4/2016 Chakrabarti et al.
2016/0105151 A1 4/2016 Langer
2016/0127003 A1 5/2016 Xu et al.
2016/0134337 A1 5/2016 Branlund
2016/0164474 A1 6/2016 Beltran et al.
2016/0172767 A1 6/2016 Ray
2016/0178731 A1 6/2016 Stove
2016/0204809 A1 7/2016 Pratt et al.
2017/0013513 A1 1/2017 Agarwal et al.
2017/0019375 A1 1/2017 Garg et al.
2017/0026845 A1 1/2017 Garg et al.
2017/0047667 A1 2/2017 Sarkar et al.
2017/0048710 A1 2/2017 Agarwal et al.
2017/0055186 A1 2/2017 Donepudi et al.
2017/0064621 A1 3/2017 Garg et al.
2017/0070436 A1 3/2017 Lubenski et al.
2017/0077979 A1 3/2017 Papa et al.
2017/0085005 A1 3/2017 Aue et al.
2017/0111482 A1 4/2017 Mishra et al.
2017/0127409 A1 5/2017 Mishra et al.
2017/0171828 A1 6/2017 Rao et al.
2017/0181119 A1 6/2017 Garg
2017/0188286 A1 6/2017 Yonekura et al.
2017/0202006 A1 7/2017 Rao et al.
2017/0208560 A1 7/2017 Papa et al.
2017/0238278 A1 8/2017 Yadav
2017/0257133 A1 9/2017 Papa et al.
2017/0264251 A1 9/2017 Cook et al.
2017/0272330 A1 9/2017 Cao et al.
2017/0273068 A1 9/2017 Choi et al.
2017/0273134 A1 9/2017 Cao et al.
2017/0288813 A1 10/2017 Khan et al.
2017/0289833 A1 10/2017 Heinikoski et al.
2017/0295510 A1 10/2017 Sharma et al.
2017/0303163 A1 10/2017 Sharma et al.
2017/0347307 A1 11/2017 Mehta et al.
2018/0019711 A1 1/2018 Wang et al.
2018/0091195 A1 3/2018 Carvalho et al.
2018/0123950 A1 5/2018 Garg et al.
2018/0152865 A1 5/2018 Atri et al.
2018/0175809 A1 6/2018 Zai et al.
2018/0279292 A1 9/2018 Luo et al.
2018/0287569 A1 10/2018 Xu et al.
2018/0299835 A1 10/2018 Testi
2019/0014585 A1 1/2019 Mishra et al.
2019/0123439 A1 4/2019 Katz
2019/0268028 A1 8/2019 Papa et al.

(56) References Cited

U.S. PATENT DOCUMENTS

| | | | |
|---|---|---|---|
| 2019/0319367 | A1 | 10/2019 | Edwards et al. |
| 2020/0091608 | A1 | 3/2020 | Alpman et al. |
| 2020/0158859 | A1 | 5/2020 | Morton |
| 2020/0187048 | A1 | 6/2020 | Mishra et al. |
| 2020/0195755 | A1 | 6/2020 | Mishra et al. |
| 2020/0274613 | A1 | 8/2020 | Gao et al. |
| 2020/0280350 | A1 | 9/2020 | Papa |
| 2020/0328785 | A1 | 10/2020 | Lee et al. |

FOREIGN PATENT DOCUMENTS

| | | | |
|---|---|---|---|
| JP | 2016511598 | A | 4/2016 |
| WO | 2010056736 | A2 | 5/2010 |
| WO | 2014178487 | A1 | 11/2014 |
| WO | 2015124778 | A1 | 8/2015 |
| WO | 2015185680 | A1 | 12/2015 |
| WO | 2018060950 | A1 | 4/2018 |
| WO | 2018091203 | A1 | 5/2018 |

OTHER PUBLICATIONS

International Search Report and Written Opinion for PCT/US2019/059534, Mar. 18, 2020, 1-10 (10 pages).

Bjornson, Emil , et al., "What Type of Power Amplifiers are to be Used in Massive MIMO?", www.researchgate.net/post/, Mar. 19, 2018, 1-4 (4 pages).

Buckel, Tobias , et al., "A Novel Digital-Intensive Hybrid Polar-I/Q RF Transmitter Architecture", IEEE Transactions on Circuits and Systems-1, Regular Papers, vol. 65, No. 12, Dec. 2018, 4390-4403 (14 pages).

Chowdhury, Debopriyo , et al., "A Fully-Integrated Efficient CMOS Inverse Class-D Power Amplifier for Digital Polar Transmitters", IEEE Radio Frequency Integrated Circuits Symposium, 2011, 1-4 (4 pages).

Chowdhury, Debopriyo , et al., "An Efficient Mixed-Signal 2.4-GHz Polar Power Amplifier in 65-nm CMOS Technology", IEEE Journal of Solid-State Circuits, vol. 46, No. 8, Aug. 2011, 1796-1809 (14 pages).

Li, Yan , et al., "A Review of Wideband Wide-Angle Scaning 2-D Phased Array and Its Applications in Satellite Communication", Journal of Communications and Information Networks, vol. 3, Issue 1, Mar. 2018, 21-30 (10 pages).

Liu, Dake , "Baseband ASIP design for SDR", China Communications, vol. 12, No. 7, 2015, 60-72 (13 pages).

McCune, E , et al., "A Fully Polar Transmitter for Efficient Software-Defined Radios", IEEE MTT-S International Microwave Symposium (IMS), Jun. 2017, 1-4(4 pages).

Meyer, Peter , "Smart Basestation Antenna for Next Generation Mobile Communication", Airrays GmbH, Airrays Wireless Solutions Semicon Innovation Village, Oct. 6, 2015, 1-9 (9 pages).

Milne, Alex , "Understanding the Difference, and Debunking the Myths, Between Active and Passive Antennas", www.rfwireless-world.com, 2014, 1-5 (5 pages).

Minard, P. , et al., "Cost/Performance Optimized IEEE802.11A/B/G Front End With Integrated Antenna Diversity", First European Conference on Antennas and Propagation, EUCAP IEEE, Nov. 6, 2006, 1-6 (6 pages).

Sim, Min Soo , et al., "Nonlinear Self-Interference Cancellation for Full-Duplex Radios: From Link-Level and System-Level Performance Perspectives", IEEE Communications Magazine, vol. 55, No. 9, Sep. 2017, 158-167 (10 pages).

Yang, Zhenchao , et al., "High Efficiency Planar Arrays and Array Feeds for Satellite Communications", https://www.semanticscholar.org/paper/High-Efficiency-Planar-Arrays-and-Array-Feeds-for-Yang-Browning/914258c3ce37e3ac69392556f31d4359a0237277; Department of Electrical and Computer Engineering, Brigham Young University, 2015, 1-6 (6 pages).

Yao, Miao , et al., "A Digital Predistortion Scheme Exploiting Degrees-of-Freedom for Massive MIMO Systems", IEEE International Conference on Communications 2018, ArXiv:1801.06023v1, Jan. 18, 2018, 1-5 (5 pages).

Yu, W.-H. , et al., "Low-complexity, full-resolution, mirror-switching digital predistortion scheme for polar-modulated power amplifiers", Electronic Letters, vol. 48, No. 24, Nov. 22, 2012, 1-2 (2 pages).

* cited by examiner

MULTI-BAND MASSIVE MIMO ANTENNA ARRAY

This application is a 35 U.S.C. 371 of International Application PCT/US2020/057782, entitled, "MULI-BAND MASSIVE MIMO ANTENNA ARRAY," filed Oct. 28, 2020, which claims the benefit of U.S. Patent Application No. 62/927,109 filed Oct. 28, 2019, entitled, "MULTI-BAND MASSIVE MIMO ANTENNA ARRAY," which is incorporated herein by reference in their entirety.

SUMMARY

An example method in accordance with some embodiments may include: a dual-band, tri-band, or higher-order multi-band array of antenna elements, with each element, or subsets of elements, connected to multiple radios at each antenna port. In one embodiment, an array comprises a 128 element Massive MIMO array having 64 horizontally-polarized (H-pol) and 64 vertically-polarized (V-pol) elements configured to provide dual polarization capability.

Some embodiments service two bands. Alternative embodiments service three frequency bands. In a three band system, one band comprises a frequency division duplex scheme referred to here as FDD, operating at 1960-2170 MHz, where the radio technology is fourth generation (4G) at a frequency range of 1960-1980 MHz uplink, 2150-2170 MHz downlink. The second band is a time division duplex channel referred to herein as TDD, operating at a frequency range of 3400-3600 MHz, where the radio technology is also 4G, at a frequency range of 3400-3440 MHz TDD; 3560-3600 MHz TDD. The third band is also TDD, but is fifth generation (5G) technology operating at 3900-4000 MHz.

In some embodiments, each frequency band utilizes a separate radio chipset, such that the array includes three radio chipsets attached to the antenna feed points of many of the array antenna elements. Some antenna elements may be connected to two radio chipsets, while others may be connected to only one chipset or to more than two chipsets. In some embodiments, multiple radio chipsets may be combined into multi-radio transceiver modules.

In some embodiments, the antenna elements are selectively connected to the transceivers via RF switches, tunable capacitors, PIN diodes, or other tuning components. Selective and dynamically configurable connections are used to provide an open circuit condition for neighboring elements of the elements selected for 2 GHz operation. At other frequencies, these elements may provide an impedance matching function. These tuning devices can be placed at the feed port of the antenna. This feature is implemented to overcome the low isolation between elements in the array at 2 GHz due to the small electrical spacing between elements (λ/4).

Furthermore, RF switches, tunable capacitors, PIN diodes, or other tuning components are used in some embodiments to connect or disconnect neighboring elements of the elements selected for 2 GHz operation, and are placed at the top of the slot where one slot transitions into the next slot, or at other locations along the element to element interface. This feature is implemented to overcome the low isolation between elements in the array at 2 GHz due to the small electrical spacing between elements (λ/4).

In some embodiments, a variable impedance is selected to optimize isolation between adjacent elements. The impedance may be capacitive or inductive, and may be embodied as a physical component or as a geometric feature of the antenna element or feed. Within a frequency band, the variable impedance results in a short circuit, open circuit, or intermediate impedance state.

In some embodiments, the antenna element is a tapered slot antenna, commonly referred to as a Vivaldi notch which is used to populate the array. A two-feed approach is used to provide desired performance for feed locations at both 2 GHz and 3.4 to 4.0 GHz frequency bands. Further embodiments may extend this approach to support three or more feeds and/or additional frequency bands. In some embodiments of the 2 GHz transceiver function, H-pol and V-pol elements that are not co-located are used as pairs to provide dual polarization performance. This increases the ability to optimize isolation between 2 GHz elements and neighboring elements.

The antenna array elements may be connected to individual transceiver chipsets, and chipsets or transceiver modules may each be configured with assigned receive signal weighting factors, the transceiver modules interconnected with high-speed data communication buses, and each transceiver module positioned adjacent to a respective antenna element in the antenna array. A method may include configuring the plurality of transceiver modules into intercommunicating module groups by enabling the associated high-speed data communication buses; receiving a plurality of wireless data signals with the plurality of transceiver modules and responsively generating a corresponding plurality of receive baseband data signals; generating a plurality of received beamformed signals by combining subsets of the receive baseband signals within each module group using the assigned receive signal weighting factors by transmitting the receive baseband signals between the transceiver modules within the module group; and demodulating the received beamformed signals.

Some embodiments of the example method may further include: obtaining a plurality of transmit digital baseband signals at the antenna array for transmission by the antenna array; distributing each transmit digital baseband signal to a respective plurality of transceiver modules; and applying a transmit signal weighting factor of the assigned signal weighting factors to the transmit digital baseband signal at each respective transceiver module.

Some embodiments of the example method may further include: generating a transmit modulated signal from the transmit digital baseband signal at each transceiver using a digital modulator and power amplifier; and combining the transmit modulated signals.

An example additional method in accordance with some embodiments may include: receiving a desired signal at an array of transceiver modules arranged on a panel array, each module positioned adjacent to one or more antenna elements on the panel array, wherein each transceiver module comprises a plurality of digital demodulators, which may include a baseband signal combiner; generating a demodulated baseband modulated signal from each of the transceiver modules; and combining the digital baseband signals at the panel array using the baseband signal combiners. For some embodiments of the example additional method, the signal combiners may be configured by a signal weighting factor. For some embodiments of the example additional method, the signal weighting factor may include a beam forming weight. For some embodiments of the example additional method, the beam forming weight may be a column weighting factor, a row weighting factor, or both.

An example apparatus in accordance with some embodiments may include: a plurality of transceiver modules in an antenna array, each transceiver having an assigned receive signal weighting factor, each transceiver module positioned adjacent to a respective antenna element in the antenna array; a plurality of high-speed data communication buses connected to the plurality of transceiver modules; a controller configured to transmit control signals to group the transceiver modules into inter-communicating module groups; a plurality of accumulators associated with the transceiver module groups configured to receive a plurality of receive baseband data signals and to apply the assigned receive signal weighting factors to form receive beamformed signals; and a demodulator configured to demodulate the received beamformed signals.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
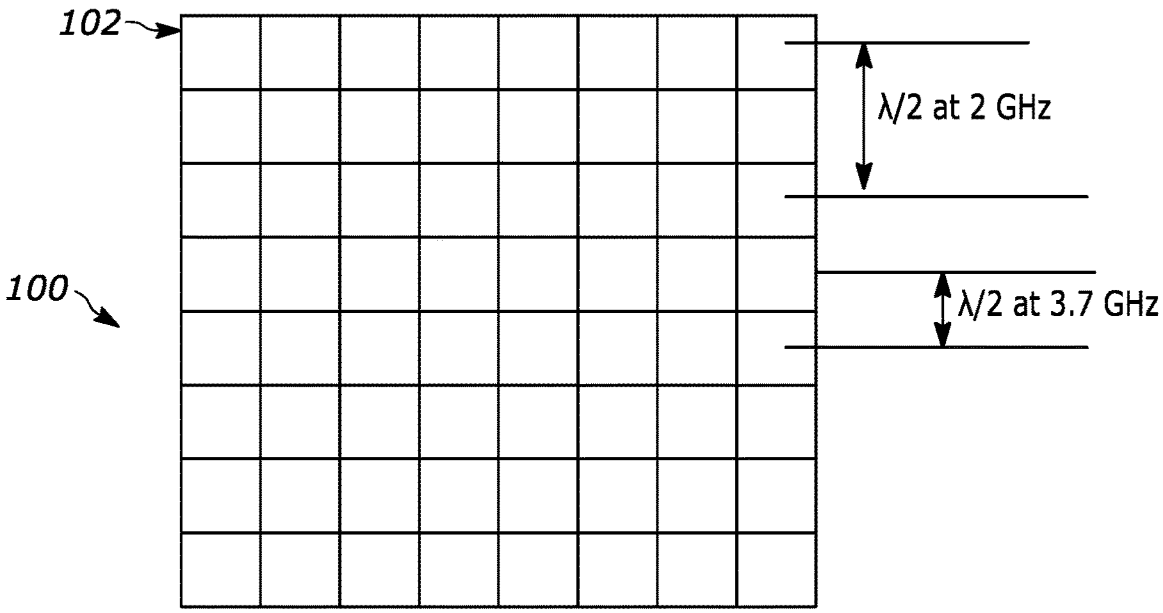
FIG. 1 depicts wideband antenna elements.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . " For brevity and clarity of presentation, this implied leading clause is not repeated ad nauseum in the detailed description of the drawings.

DETAILED DESCRIPTION

Disclosed herein is a Massive MIMO array design targeting an application where dual-band or tri-band performance is provided. The array elements are designed to populate the array to cover multiple frequency bands. In some embodiments, the individual array elements are Vivaldi notch elements. For the 3.9 GHz 5G application, all elements of the array can be used. For the 4G applications at 2.0 GHz and 3.6 GHz, one or more subsets of elements in the array are combined to form one or. more fixed or scanned beams. The multi-band array of one embodiment contains 8×8 (64 dual-linearly polarized) elements with all elements used in a 5G Massive MIMO application. Sixteen of the elements can simultaneously be used as a sub-array for use at the 3.4 to 3.6 GHz band for 4G application. Additionally, in some embodiments, two pairs of elements, each in a 2×4 configuration are used to provide fixed beams for use at 2 GHz.

The dual-band array can be configured to meet the following requirements:

Frequency band:

FDD: 1960-2170 MHz 4G (1960-1980 MHz uplink, 2150-2170 MHz downlink)

TDD: 3400-3600 MHz 4G (3400-3440 MHz TDD; 3560-3600 MHz TDD)

TDD: 3900-4000 MHz 5G

Total output power: 10 W

Dual linear

FIG. 1 depicts dual-band antenna elements 102 used to populate each element of an 8×8 position, 64 position total (dual polarization providing a total of 128 separate elements) array 100 for use as a dual-band Massive MIMO array. Each dual band element will cover both the 1960-2170 and 3400-4000 MHz bands. As depicted in FIG. 1, the elements are positioned such that adjacent elements are spaced at substantially one-half wavelength apart ($\lambda_{HB}/2$) for high-band frequencies (3400-4000 MHz, with $\lambda_{HB}/2$=40.5 mm), and every-other element (i.e., alternately-spaced elements) are spaced at substantially $\lambda_{LB}/2$ for low-band frequencies (1960-2170 MHz, with $\lambda_{LB}/2$=72.5 mm). In some embodiments, spacing elements at substantially $\lambda/2$ for one frequency means within approximately 10-15% of $\lambda/2$ for the corresponding elements of the other frequency. That is, when considering element spacing between adjacent elements compared to alternate elements, spacing that is exactly $\lambda/2$ for one band will provide $\lambda/2\pm10\%$ in the other band. In some embodiments, the spacing will be between the two ideal spacings such that adjacent elements will be somewhat closer than $\lambda_{HB}/2$ (e.g., 39.5 mm) and alternate elements will be somewhat farther than $\lambda_{LB}/2$ (e.g., 79.0 mm). In such an arrangement, all elements may be used for operation at the high-band, while one or more sets of alternately-spaced elements may be used at the lower band. In some embodiments, the respective $\lambda/2$ spacing may be most easily accommodated when the lower band and upper band are separate by approximately an octave (i.e., frequency doubling).

Thus, some embodiments are configured to operate such that a center frequency of the first frequency band is approximately twice a center frequency of the second frequency band. Alternatively, some embodiments are configured such that a spacing between adjacent antenna elements is substantially equal to $\lambda_{F1}/2$, where $\lambda_{F1}$ is a wavelength of a center frequency of the first frequency band, and a spacing between alternate antenna elements is substantially equal to $\lambda_{F2}/2$, where $\lambda_{F2}$ is a wavelength of a center frequency of the second frequency band.

Figure 2:
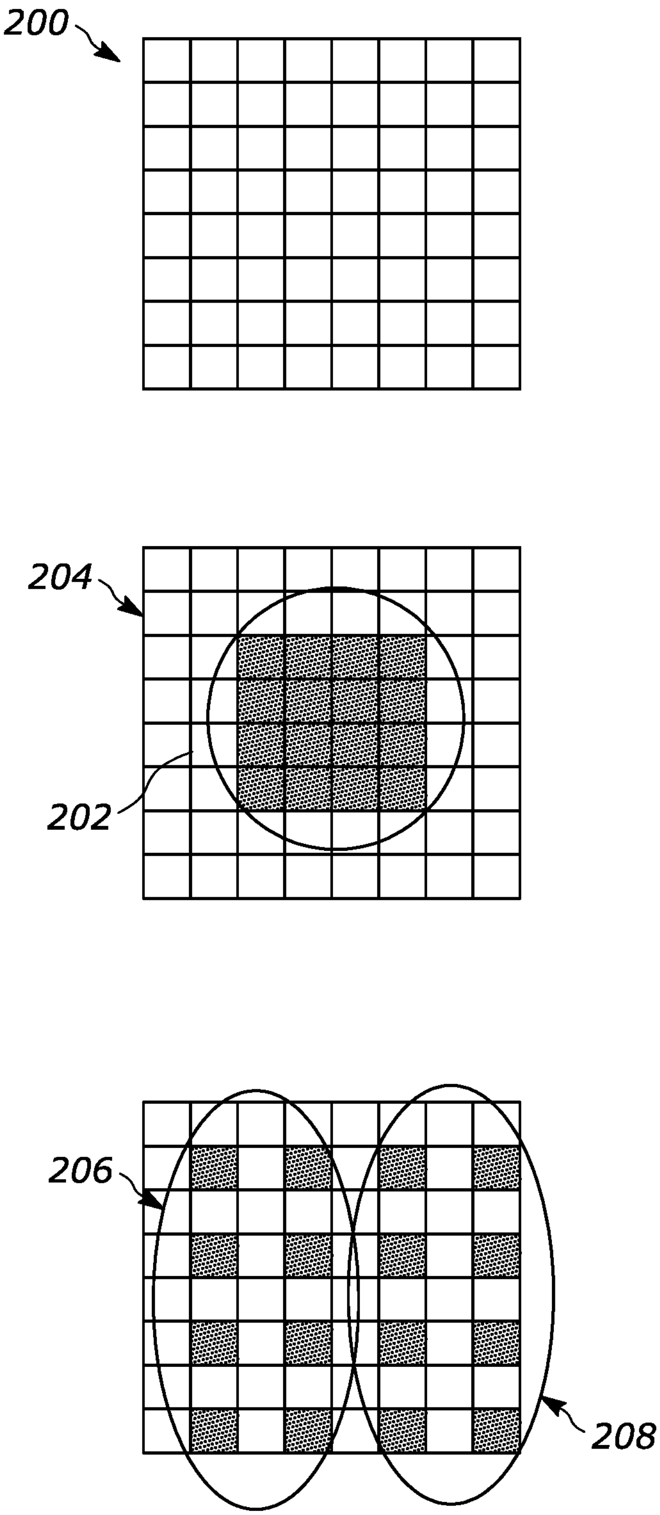
FIG. 2 depicts array configurations for three examples of different modes of the array.

FIG. 2 depicts array configurations for the three modes of the array, where the wideband element will cover both the 1960-2170 and 3400-4000 MHz bands. The top configuration 200 shows a TDD mode: 3900-4000 MHz, 5G operation. All antenna elements may be used for this mode. The center configuration 204 depicts a TDD mode operating at 3400-3600 MHz, 4G (specifically, 3400-3440 MHz TDD; 3560-3600 MHz TDD). The center 16-element sub-array 202 formed to provide beam scanning. The bottom configuration depicts an FDD mode, operating at 1960-2170 MHz, utilizing 4G technology (1960-1980 MHz uplink, 2150-2170 MHz downlink). Two groups of elements 206, 208 are used to form two sub-arrays to provide fixed beams, or dynamically formed beams.

Figure 3:
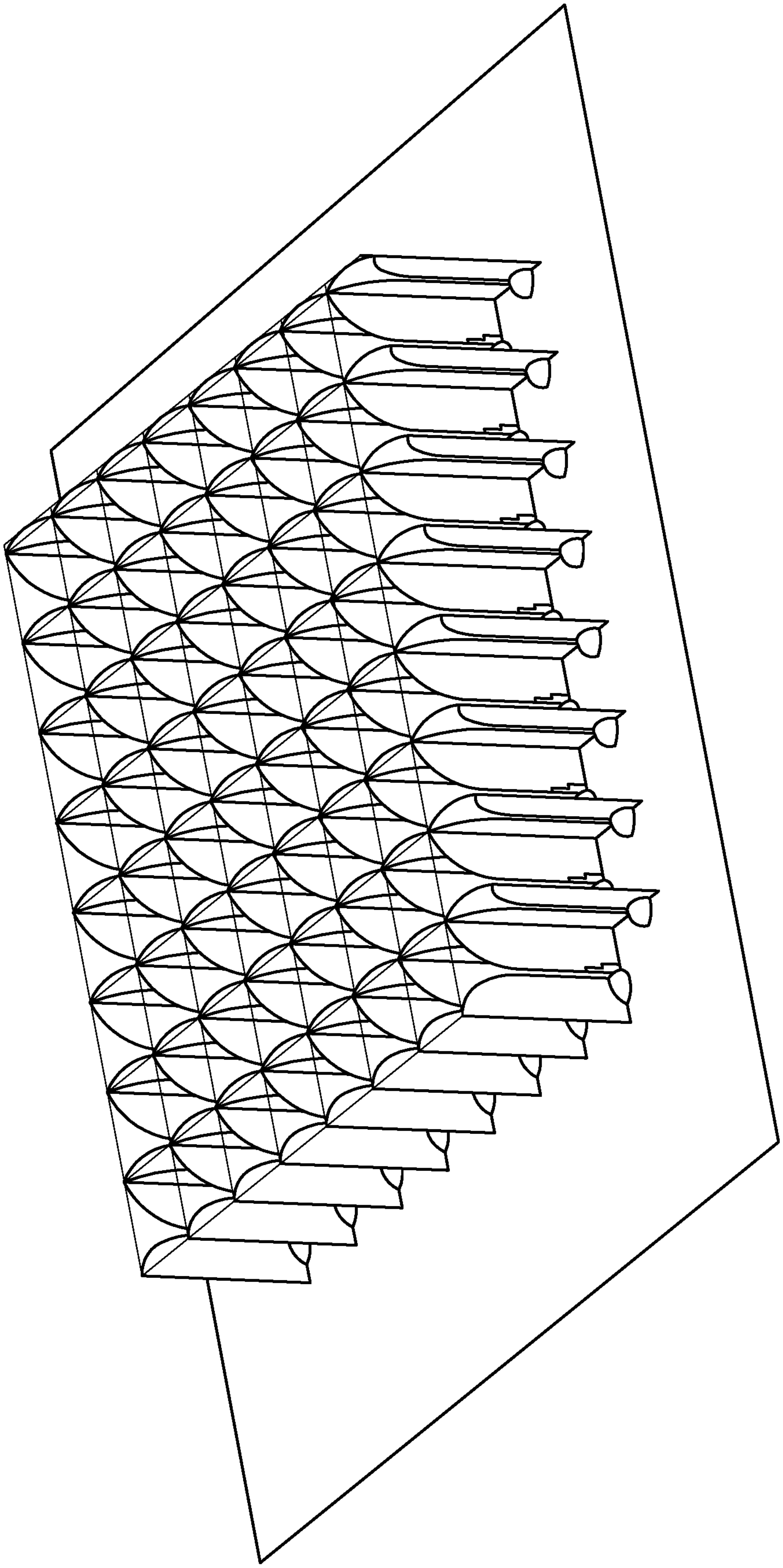
FIG. 3 depicts an array of 64 dual-polarization elements
Figure 6:
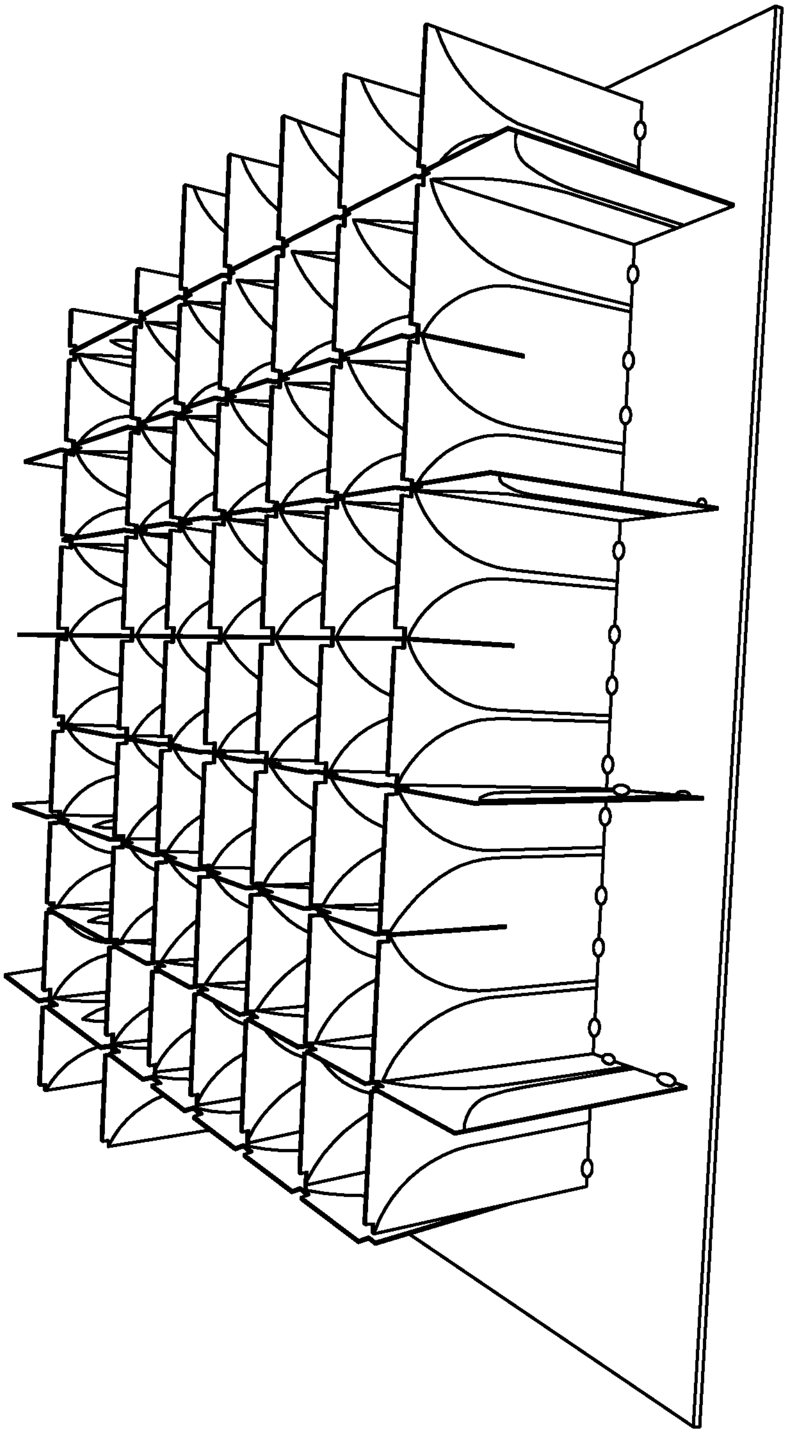
FIGS. 6 and 7 are an "egg-crate" configuration of Vivaldi elements in an array in accordance with an embodiment.
Figure 7:
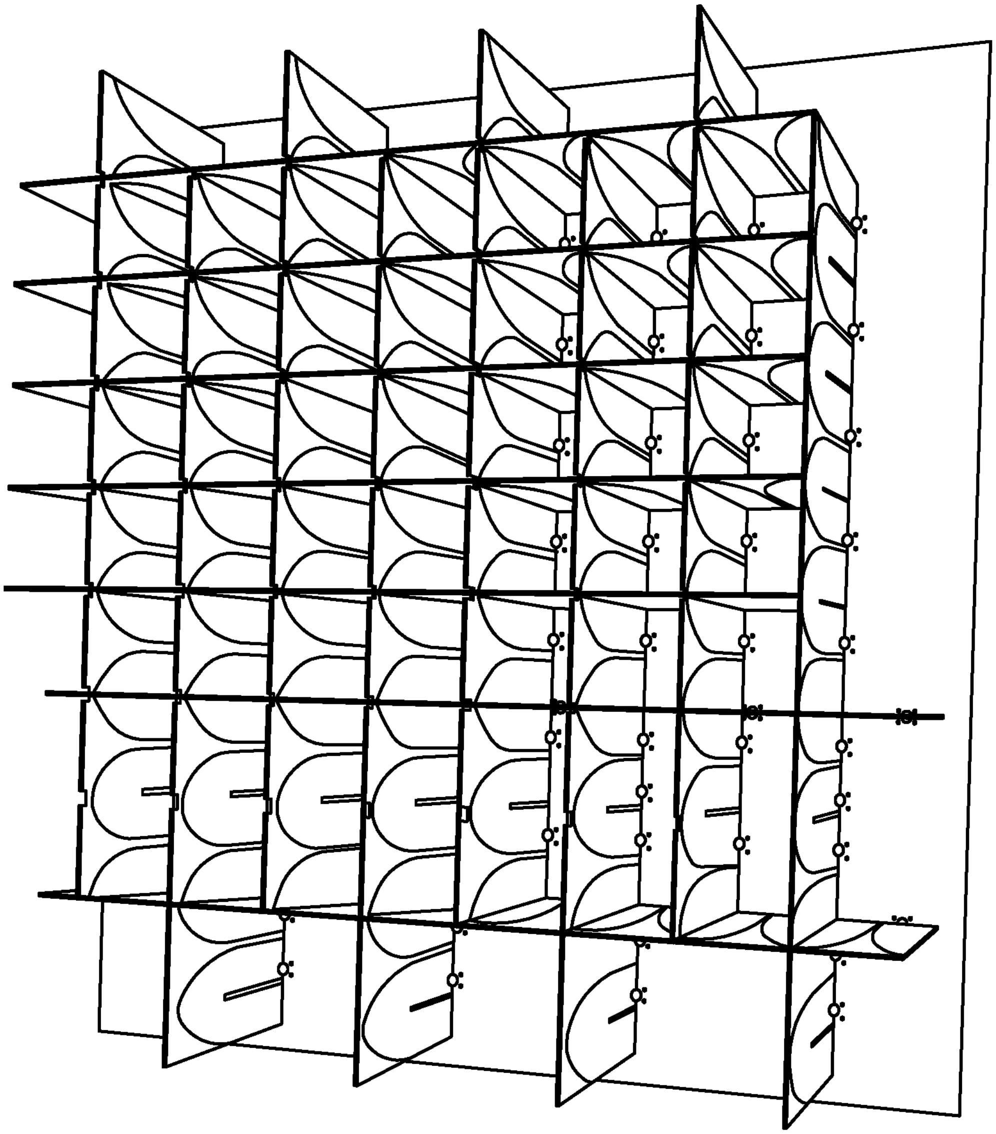
Figure 8:
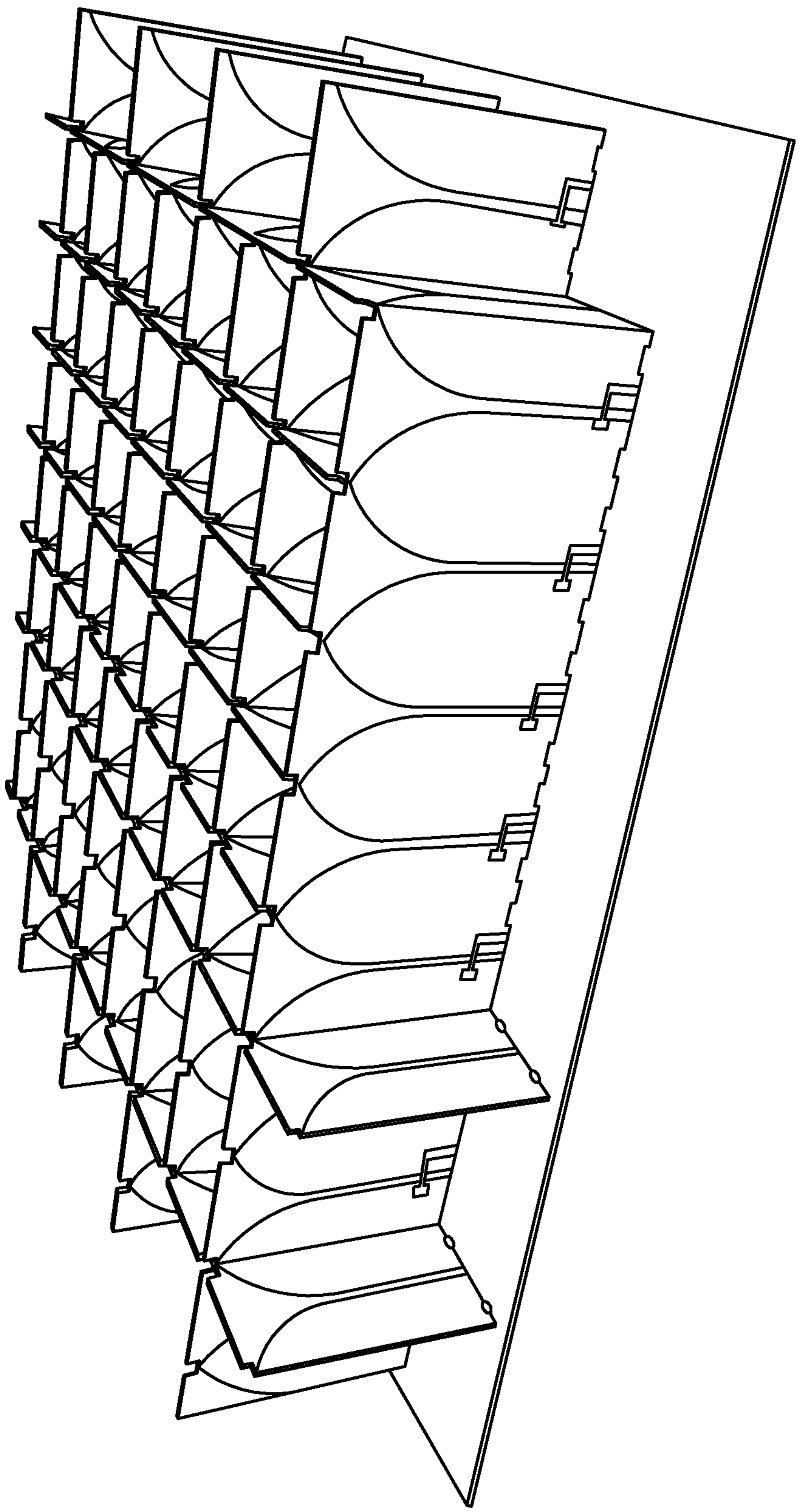
FIG. 8 depicts an array in accordance with an embodiment, showing a row of high band elements.
Figure 9:
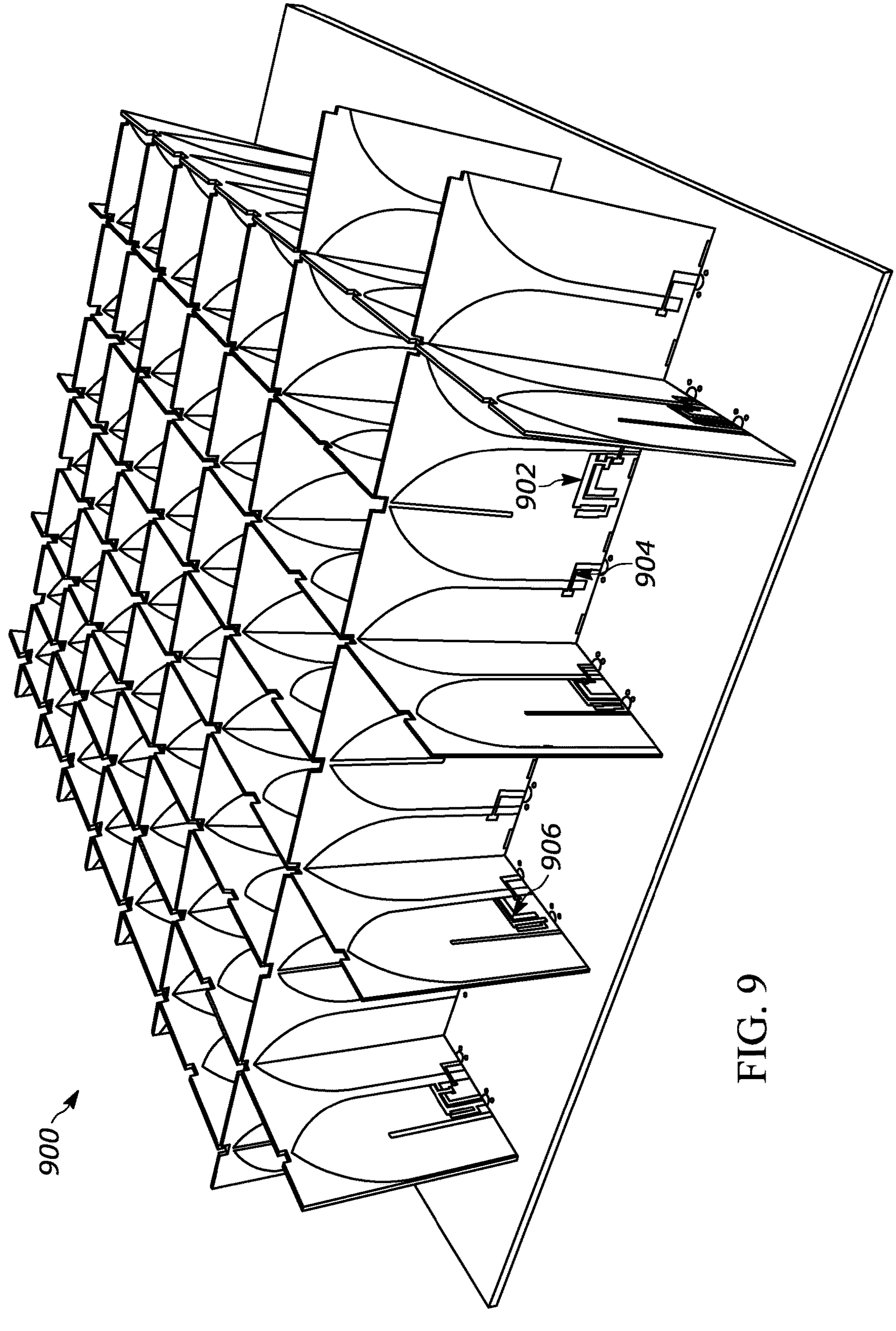
FIG. 9 is a an array in accordance with an embodiment, showing a mix of dual band and high band elements.

FIG. 3 depicts 128 elements in a paired configuration providing 64 dual-polarized elements; a 64 element array, 8×8 configuration, of small notches, dual polarization; 89 mm element height; 39.5 mm element spacing along both axes. One embodiment of such a configuration is shown in FIGS. 6 and 7. Two types of antenna elements are incorporated in this array to support dual frequency operation—single port and dual port. In a first high frequency band, all elements are active and have a high frequency 5G port, while a subset of elements (e.g., every alternate element, or two or more groupings of every-alternate element) are also active in a second low frequency 4G band and have a second port for operating in the lower 4G band. As shown in FIG. 1, the spacing between dual band elements is optimized for the subset of dual band elements to collectively act as an actively driven multi-antenna array within the second low frequency band, while the spacing between all elements (including both high frequency and dual band) is optimized for all elements to collectively act as an actively driven multi-antenna array within the first high frequency band. In a preferred operational environment the high frequency band is offset by approximately one octave (i.e. at twice the frequency) of the low frequency band. The dual band subset of elements are designed to operate in both a high frequency mode and a low frequency mode, while the balance of the array elements operate only in a high frequency mode. FIG. 8 shows a row of high band elements in an array, and FIG. 9 shows a combination of high band-only elements 904 and dual band elements 902, 906 in the same array 900.

Figure 4:
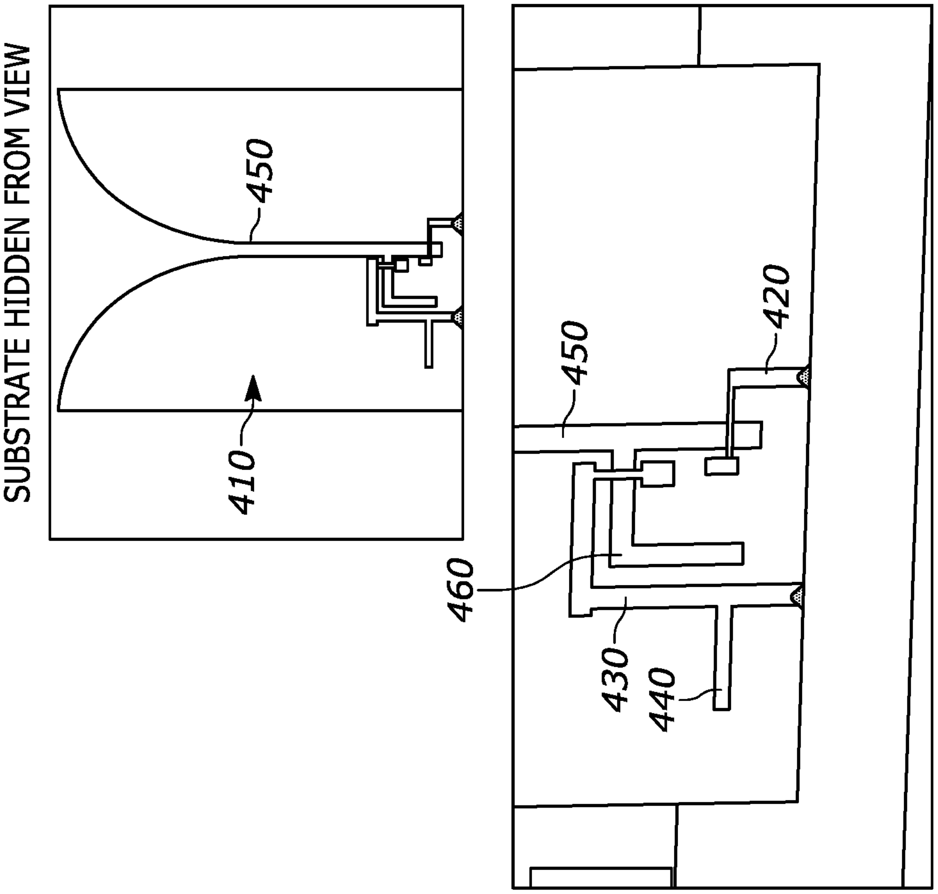
FIG. 4 illustrates one embodiment of a dual band Vivaldi element with two feed ports.

In some embodiments, separate feed ports are incorporated in the dual band elements to allow attachment to separate radio transceivers for each band of operation, or alternatively, for each mode of operation. FIG. 4 illustrates one embodiment of a Vivaldi antenna element 410 incorporating separate feed lines and attachments for high band feedline 420 and low band feedline 430. In this particular embodiment, the main slot, or notch 450 of the Vivaldi Notch element is formed by etching, or removing, a metallization layer disposed on one surface of a dielectric substrate (such as fiberglass, commonly referred to as F4, or an alternative such as Teflon-coated glass dielectric), and extends straight down, while a secondary slot 460 is etched in the metallization layer and branches off of the main slot 450 to provide for a second port. On the other side of the dielectric, metallic traces, or striplines 420 and 430 provide for the high band and low band feedlines, respectively. Note that the low band feedline 430 includes a microstripline stub 440 to suppress extraneous signal coupling to the low band port 430 during high band operation. Further embodiments may incorporate different or additional known art topological structures to provide additional filtering or impedance-matching capabilities. In some examples, the slot 460 for the low band port, shown to include a right-angle bend, may be configured to have a curve, and may depart from the main slot 450 at an angle. Note also the stub tuning element in element 902 of FIG. 9, which depicts a stub tuning element turning upwards at 90 degrees. The overall length of the stub tuning element dominates the frequency characteristics, rather than the orientation. Thus, the orientation may be altered to provide space for additional ports, such as a third slot or notch if desired. Generally, the operating frequency associated with a given port may be determined according to the electrical length of the slot. Thus, some embodiments are configured such that each low band feedline is coupled to a respective microstrip stub that suppresses signal energy in the higher frequency band from coupling to the low band feedline port.

Figure 5:
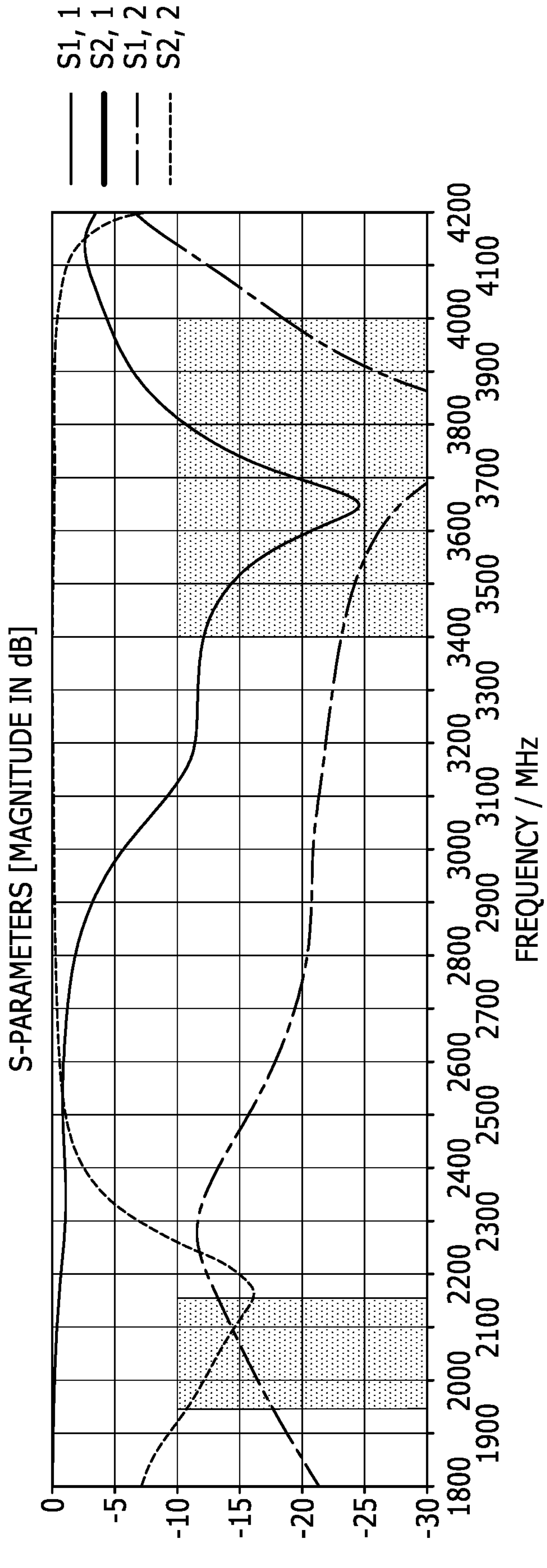
FIG. 5 is a graph of return loss and isolation of the two port Vivaldi element.

FIG. 5 is a graph of the S-parameters showing the return loss and isolation of the two port Vivaldi element.

Some embodiments of the array of tapered slot antenna elements are configured such that each antenna element has a horizontal polarization portion and a vertical polarization portion. Each portion of each antenna element has a first tapered slot formed by a gap in a metallization layer positioned on a first side of a dielectric substrate, and an associated first feedline port formed from a first metallization stripline positioned on a second side of the dielectric substrate, the first metallization stripline crossing over the first gap in the metallization layer to couple electromagnetic radiation from the antenna element to free space within a first frequency band. At least a subset of the antenna elements, and in some cases all of the antenna elements, have a second slot joined to the first slot that is formed by a second gap in the metallization layer positioned on the first side of the dielectric substrate, and an associated second feedline port formed from a second metallization stripline positioned on the second side of the dielectric substrate, the second metallization stripline crossing over the second gap in the metallization layer to couple electromagnetic radiation from the antenna element to free space within a second frequency band, the second frequency band being lower than the first frequency band.

The array may be configured with individual transceivers to operate each antenna element. In some embodiments, the first feedline of each element of the array of tapered slot antenna elements is connected to a respective radio frequency transceiver operating within the 3400 to 4000 MHz frequency band, and each second feedline of each antenna element of the subset of antenna elements is connected to a respective radio frequency transceiver operating within the 1960 to 2170 frequency band.

Furthermore, each radio frequency transceiver operating within the 1960 to 2170 MHz frequency band may be connected to the corresponding antenna element using a diplexer to allow simultaneous signal transmission within a first sub-band of 1960 to 2170 MHz frequency band, and signal reception within a second sub-band of the 1960 to 2170 MHz frequency band.

Figure 10:
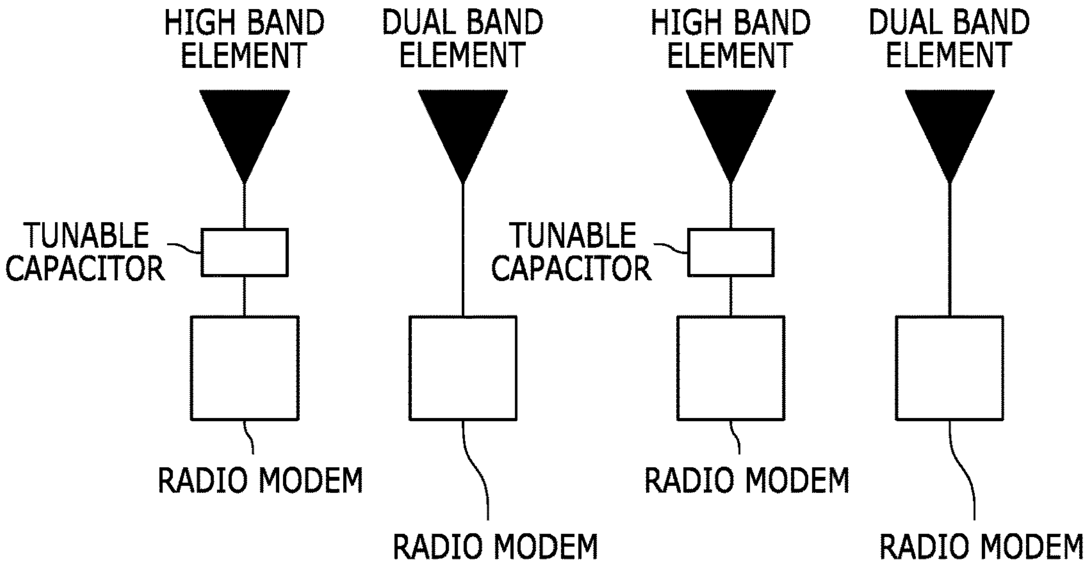
FIG. 10 illustrates variable tuning applied to high band elements for improved low band performance.

As shown schematically by FIG. 10, tunable elements may be associated with some antenna elements to provide and impedance adjustment in one or more frequency bands. As one example, a tunable capacitor may be used to intentionally detune particular high band elements for selected array configurations and bands of operation. One representative embodiment uses varactor diodes to provide the tunable capacitance, controlled by a DC signal superimposed on the feed RF signal. In one example offered without implying limitation, a high band 3400-4000 MHz radio system and a low band system may be synchronized in time, such that the antenna system is using only one frequency band at a time, with particular sets of antenna elements driven and tuned as appropriate to the immediate need. The tunable impedance may be selectively controlled to provide a high impedance, low impedance, or intermediate impedance when the second frequency band is in use. This feature is implemented to overcome the low isolation between elements in the array at 2 GHz due to the small electrical spacing between elements (λ/4).

Other embodiments may incorporate other active components in antenna elements, as one example a PIN switching diode to additionally direct or isolate signals in various modes of operation. Switching or tuning control may be implemented using DC signals superimposed on the RF feeds, or by control signals separate from the RF feeds.

Figure 11:
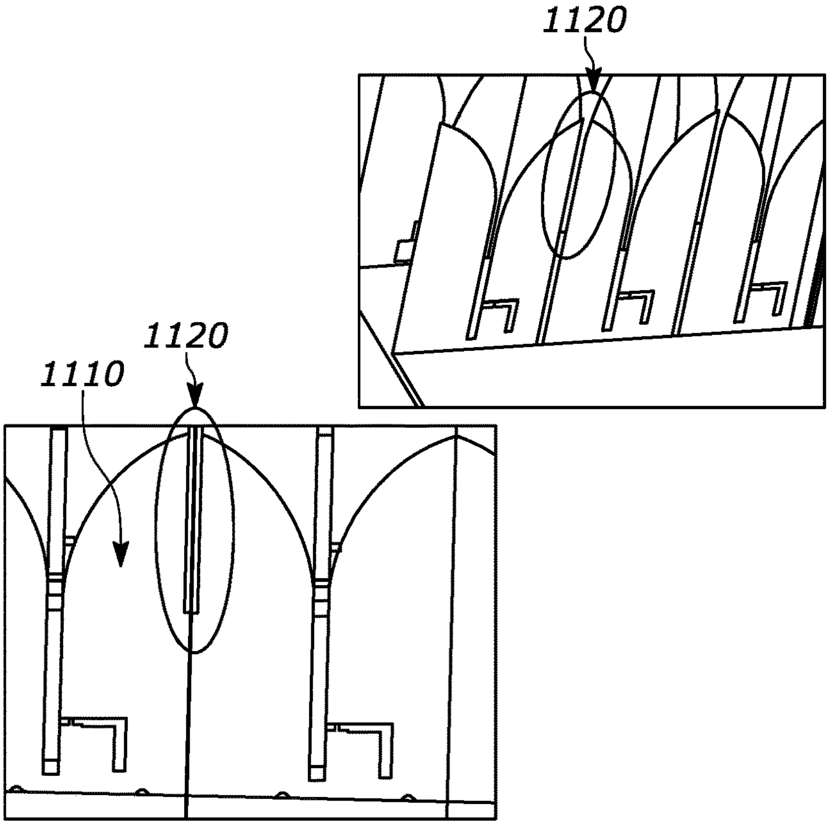
FIG. 11 illustrates a choke slot incorporated in an antenna element.

FIG. 11 shows another embodiment, in which a choke slot structure 1120 is incorporated at the intersection between a first fin of a Vivaldi structures 1110, and an adjacent fin so as to suppress current flow from one Vivaldi antenna element to the next, thus improving low band array performance by electrically disconnecting adjacent elements in the array.

As will be apparent to one familiar with the art, the described attachment of two feed ports on selected antenna elements may be extended to support elements incorporating more than two feed ports. Similarly, operation in more than two frequency bands, additional emission patterns, and/or attachment to different numbers of radio systems may be accommodated using the methods and apparatus described herein.

Additional modes of antenna array operation may be obtained by selectively driving subsets of antenna elements, as shown in FIG. 2. Different subsets of antenna elements may be associated with different sets of feed ports, allowing three or more distinct emission patterns to be supported by appropriate selection of feed ports. The 16 element central sub-array of a 64 element array illustrated in FIG. 2 is one representative example.

Figure 12:
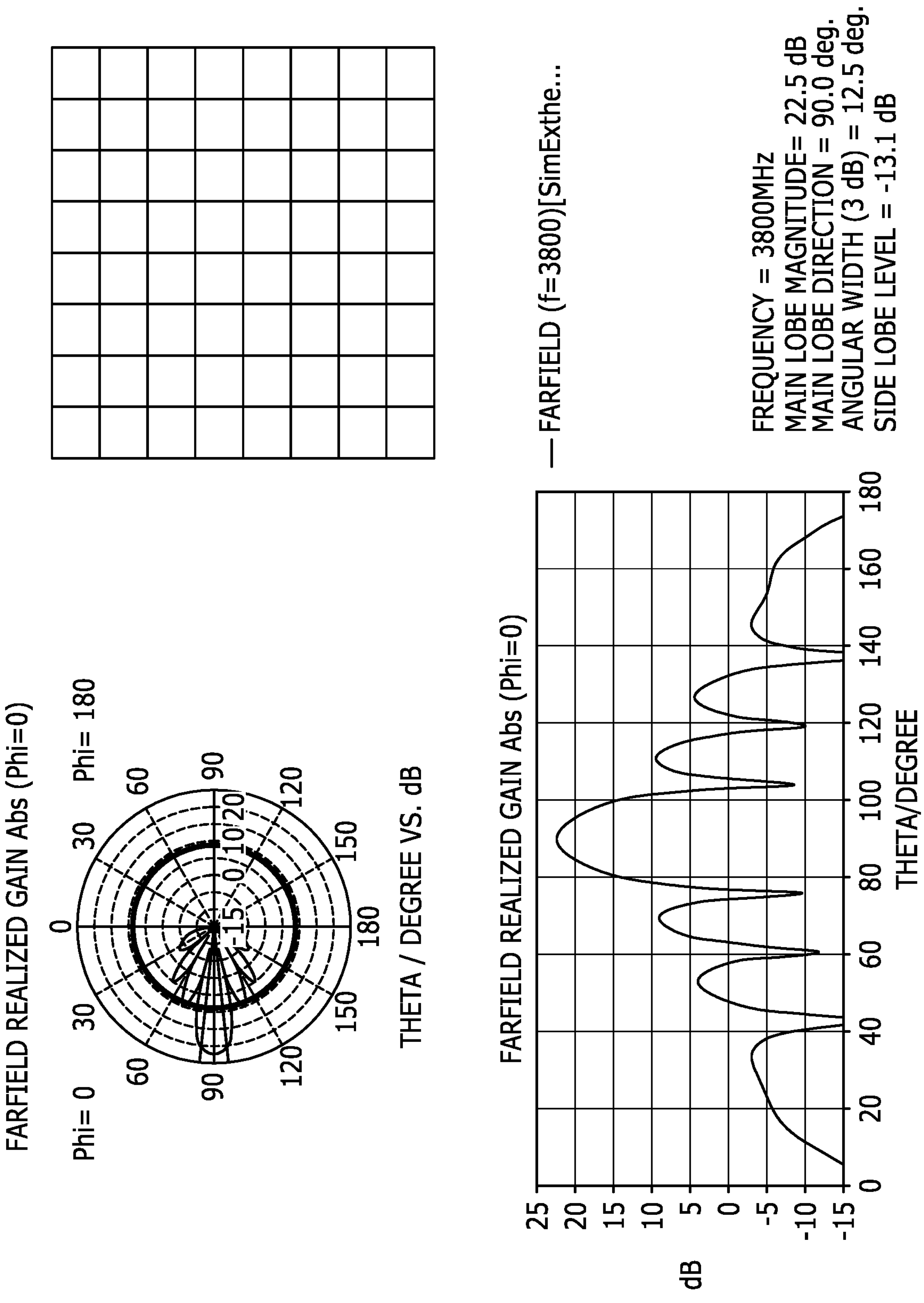
FIG. 12 shows a radiation pattern of the 64-element high band array. The frequency of the radiation pattern is 3800 MHz.
Figure 13:
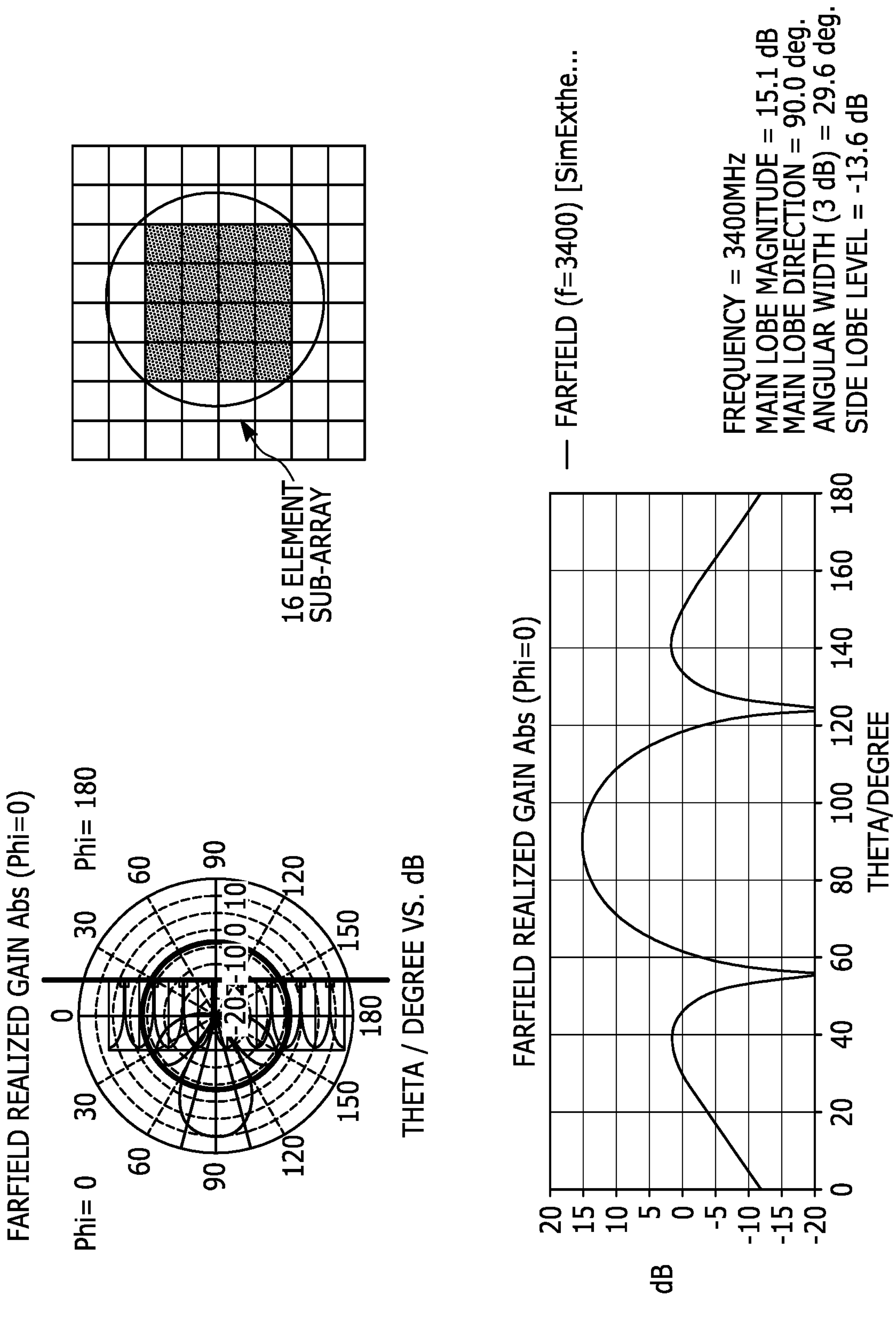
FIG. 13 shows a high band radiation pattern of a sub-array of 16 elements located in the mid-portion of the array. The frequency of the radiation pattern is 3400 MHz.

FIG. 12 shows the beam pattern for a first mode of operation, in which all 64 elements are driven at 3800 MHz. FIG. 13 shows a central 16 element sub-array used in a TDD mode: 3400-3600 MHz, 4G technology (3400-3440 MHz TDD; 3560-3600 MHz TDD). The 16-element sub-array is formed to provide beam scanning.

Figure 14:
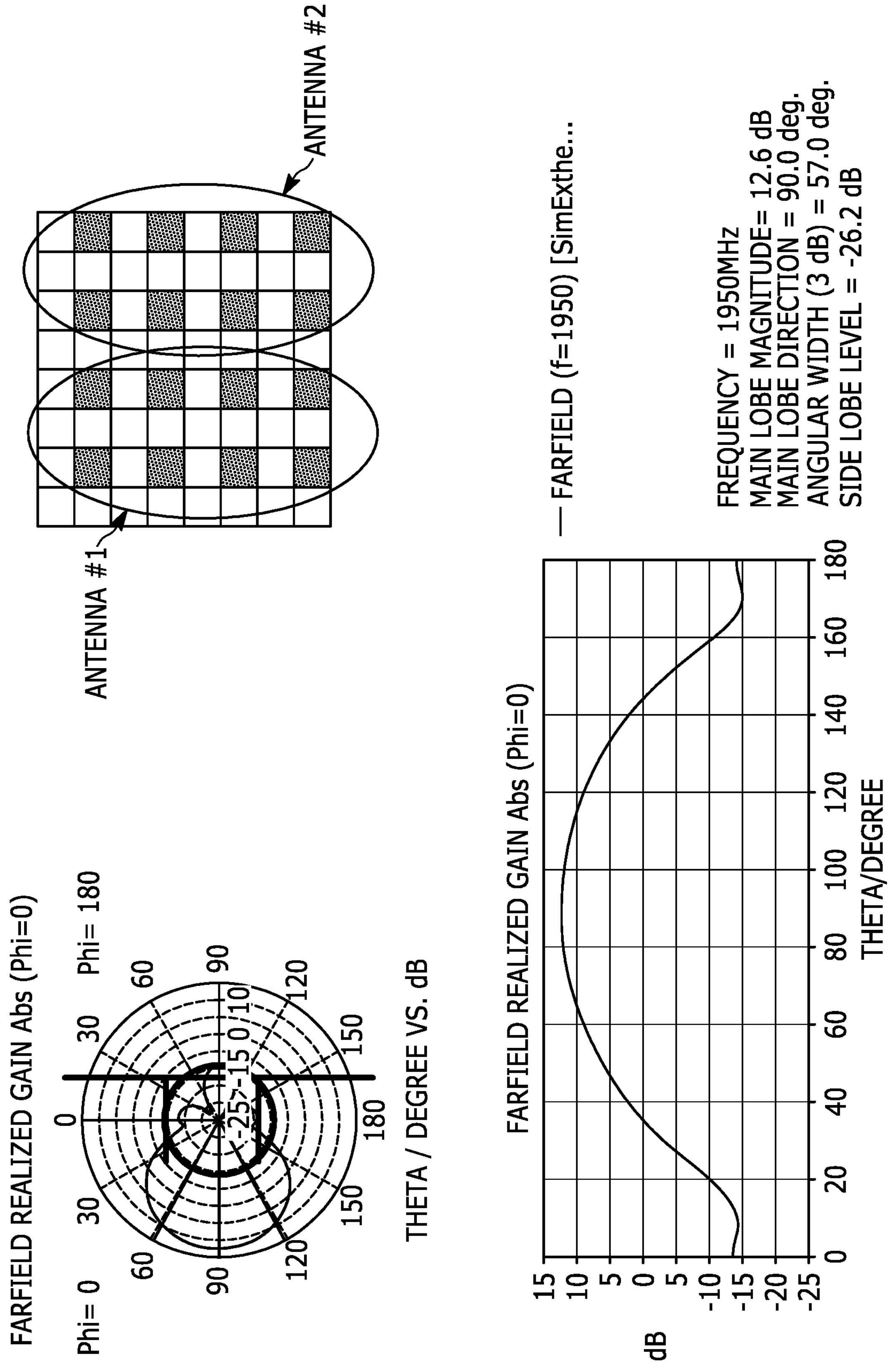
FIG. 14 shows the low band radiation pattern of one of two 8-element low band sub-arrays formed from elements within the 64-element dual band array. The frequency of the radiation pattern is 1950 MHz.

FIG. 14 shows two groups of elements used to form two sub-arrays to provide fixed beams operating as FDD at frequencies of 1960-2170 MHz, intended for 4G technology transmissions (1960-1980 MHz uplink, 2150-2170 MHz downlink).

In some embodiments, the groups of elements associated with each sub-array share at least one common feed port configuration, such that the sub-array may be selected by selecting that common feed port. In an alternative embodiment, said common feed port configuration may physically span a greater number of elements, with frequency-selective elements such as the previously described frequency-depended filters (e.g. stripline stubs) and/or active switching elements (e.g. PIN diodes) in selected antenna elements subsequently limiting the set of active elements to the desired sub-array within a particular frequency band.

For some embodiments of a method, one or more transceiver modules may be configured with a weighting factor used for beam forming.

Some embodiments of a method may include receiving a desired signal at an array of transceiver modules arranged on a panel array, each module positioned adjacent to an antenna element on the panel array, wherein each transceiver module may include a plurality of digital demodulators, and may include a baseband signal combiner; generating a demodulated baseband modulated signal from each of the transceiver modules; and combining the digital baseband signals at the panel array using the baseband signal combiners.

In some embodiments of a method, the signal combiners may be configured by a signal weighting factor. In some embodiments of a method, the signal weighting factor may include a beam forming weight. In some embodiments of a method, the beam forming weight may be a column weighting factor, a row weighting factor, or both.

Some embodiments of an apparatus may include: a plurality of transceiver modules configured in an antenna array; a synchronization transmission circuit configured to transmit a synchronization signal to the plurality of transceiver modules; a receive carrier generation circuit configured to generate a receive carrier reference signal; and a synchronization processing circuit configured to process the synchronization signal and to align a phase of the receive carrier reference signal.

Some embodiments of an apparatus may include: a plurality of transceiver modules arranged in an array and configured to receive a digital baseband signal; a plurality of digital modulators and power amplifiers each configured to generate a transmit modulated signal from the digital baseband signal; and a combiner configured to combine the transmit modulated signals.

Some embodiments of an apparatus may include: a plurality of antenna elements on a panel array; a plurality of transceiver modules arranged on the panel array to be adjacent to one of the plurality of antenna elements and configured to receive a desired signal, wherein each transceiver module may include a plurality of digital demodulators, and includes a baseband signal combiner; a demodulation circuit configured to generate a demodulated baseband signal from each of the transceiver modules; and a combiner configured to combine the digital baseband signals at the panel array using the baseband signal combiners.

In further embodiments, a method comprises providing a plurality of first transmit signals in a first frequency band to an array of tapered slot antenna elements, each antenna element having a horizontal polarization portion and a vertical polarization portion. Each of the plurality of first transmit signals being provided between a metallization layer of each antenna element having a first tapered slot formed by a gap in a metallization layer positioned on a first side of a dielectric substrate, and an associated first feedline port formed from a first metallization stripline positioned on a second side of the dielectric substrate, the first metallization stripline crossing over the first gap in the metallization layer to couple electromagnetic radiation from the antenna element to free space within the first frequency band. Further, the plurality of second transmit signals in a second frequency band may be provided to at least a subset of the antenna elements having a second slot joined to the first slot and formed by a second gap in the metallization layer positioned on the first side of the dielectric substrate, and an associated second feedline port formed from a second metallization stripline positioned on the second side of the dielectric substrate, the second metallization stripline crossing over the second gap in the metallization layer to couple electromagnetic radiation from the antenna element to free space within the second frequency band, the second frequency band being lower than the first frequency band.

The method may include using at least a subset of the antenna elements that comprises alternately-spaced antenna elements or elements such that a center frequency of the first frequency band is approximately twice a center frequency of the second frequency band.

The method may include spacing adjacent antenna elements to be substantially equal to $\lambda_{F1}/2$, where $\lambda_{F1}$ is a wavelength of a center frequency of the first frequency band, and spacing alternate antenna elements to be substantially equal to $\lambda_{F2}/2$, where $\lambda_{F2}$ is a wavelength of a center frequency of the second frequency band.

Some methods may generate the first plurality of transmit signals by a respective first plurality of radio frequency transceivers operating within the 3400 to 4000 MHz frequency band, and generating the plurality of second transmit signals by a respective second plurality of transceivers operating in a frequency division duplex mode within the 1960 to 2170 MHz frequency band.

In the foregoing specification, specific embodiments have been described. However, one of ordinary skill in the art would appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about", or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Accordingly, some embodiments of the present disclosure, or portions thereof, may combine one or more processing devices with one or more software components (e.g., program code, firmware, resident software, micro-code, etc.) stored in a tangible computer-readable memory device, which in combination form a specifically configured apparatus that performs the functions as described herein. These combinations that form specially programmed devices may be generally referred to herein as "modules." The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that separate processor devices and/or computing hardware platforms perform the described functions.

Moreover, an embodiment can be implemented as a computer-readable storage medium having computer readable code stored thereon for programming a computer (e.g., comprising a processor) to perform a method as described and claimed herein. Examples of such computer-readable storage media include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An apparatus comprising:

an array of tapered slot antenna elements, each antenna element having a horizontal polarization portion and a vertical polarization portion;

each portion of each antenna element having a first tapered slot formed by a gap in a metallization layer positioned on a first side of a dielectric substrate, and an associated first feedline port formed from a first metallization stripline positioned on a second side of the dielectric substrate, the first metallization stripline crossing over the first gap in the metallization layer to couple electromagnetic radiation from the antenna element to free space within a first frequency band;

at least a subset of the antenna elements having a second slot joined to the first slot and formed by a second gap in the metallization layer positioned on the first side of the dielectric substrate, and an associated second feedline port formed from a second metallization stripline positioned on the second side of the dielectric substrate, the second metallization stripline crossing over the second gap in the metallization layer to couple electromagnetic radiation from the antenna element to free space within a second frequency band, the second frequency band being lower than the first frequency band.

2. The apparatus of claim 1, wherein the at least a subset of the antenna elements comprises alternately-spaced antenna elements.

3. The apparatus of claim 1, wherein a center frequency of the first frequency band is approximately twice a center frequency of the second frequency band.

4. The apparatus of claim 1, wherein a spacing between adjacent antenna elements is substantially equal to $\lambda_{F1}/2$, where $\lambda_{F1}$ is a wavelength of a center frequency of the first frequency band, and a spacing between alternate antenna elements is substantially equal to $\lambda_{F2}/2$, where $\lambda_{F2}$ is a wavelength of a center frequency of the second frequency band.

5. The apparatus of claim 1, wherein the first feedline of each element of the array of tapered slot antenna elements is connected to a respective radio frequency transceiver operating within the 3400 to 4000 MHz frequency band, and each second feedline of each antenna element of the subset of antenna elements is connected to a respective radio frequency transceiver operating within the 1960 to 2170 frequency band.

6. The apparatus of claim 5, wherein each radio frequency transceiver operating within the 1960 to 2170 MHz frequency band is connected to the corresponding antenna element using a diplexer to allow simultaneous signal transmission within a first sub-band of 1960 to 2170 MHz frequency band, and signal reception within a second sub-band of the 1960 to 2170 MHz frequency band.

7. The apparatus of claim 1, wherein the at least a subset of antenna elements are configured into two or more groups of elements, wherein each group of the two or more groups form a sub-array.

8. The apparatus of claim 1, wherein each second feedline is coupled to a respective microstrip stub that suppresses signal energy in the first frequency band from coupling to the second feedline port.

9. The apparatus of claim 1, further comprising a selectable impedance element connected to antenna elements positioned between elements of the at least a subset of the antenna elements, the selectable impedance elements configured to switch to one of a high impedance, low impedance, or intermediate impedance when the second frequency band is in use.

10. The apparatus of claim 9, wherein the selectable impedance element is a tunable capacitor.

11. The apparatus of claim 1, wherein adjacent tapered slot antennas comprise a choke slot between the adjacent elements.

12. A method comprising:

providing a plurality of first transmit signals in a first frequency band to an array of tapered slot antenna elements, each antenna element having a horizontal polarization portion and a vertical polarization portion; each of the plurality of first transmit signals being provided between a metallization layer of each antenna element having a first tapered slot formed by a gap in a metallization layer positioned on a first side of a dielectric substrate, and an associated first feedline port formed from a first metallization stripline positioned on a second side of the dielectric substrate, the first metallization stripline crossing over the first gap in the metallization layer to couple electromagnetic radiation from the antenna element to free space within the first frequency band;

providing a plurality of second transmit signals in a second frequency band to at least a subset of the antenna elements having a second slot joined to the first slot and formed by a second gap in the metallization layer positioned on the first side of the dielectric substrate, and an associated second feedline port formed from a second metallization stripline positioned on the second side of the dielectric substrate, the second metallization stripline crossing over the second gap in the metallization layer to couple electromagnetic radiation from the antenna element to free space within the second frequency band, the second frequency band being lower than the first frequency band.

13. The method of claim 12, wherein the at least a subset of the antenna elements comprises alternately-spaced antenna elements or wherein a center frequency of the first frequency band is approximately twice a center frequency of the second frequency band.

14. The method of claim 12, wherein a spacing between adjacent antenna elements is substantially equal to $\lambda_{F1}/2$, where $\lambda_{F1}$ is a wavelength of a center frequency of the first frequency band, and a spacing between alternate antenna elements is substantially equal to $\lambda_{F2}/2$, where $\lambda_{F2}$ is a wavelength of a center frequency of the second frequency band.

15. The method of claim 12, wherein the first plurality of transmit signals are generated by a respective first plurality of radio frequency transceivers operating within the 3400 to 4000 MHz frequency band, and wherein the plurality of second transmit signals are generated by a respective second plurality of transceivers operating in a frequency division duplex mode within the 1960 to 2170 MHz frequency band.

* * * * *